(12) United States Patent
Watanabe et al.

(10) Patent No.: US 8,764,584 B2
(45) Date of Patent: *Jul. 1, 2014

(54) MULTI-PIECE SOLID GOLF BALL

(75) Inventors: Hideo Watanabe, Chichibushi (JP); Akira Kimura, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 699 days.

This patent is subject to a terminal disclaimer.

(21) Appl. No.: 13/030,221

(22) Filed: Feb. 18, 2011

(65) Prior Publication Data

US 2011/0143862 A1     Jun. 16, 2011

Related U.S. Application Data

(63) Continuation-in-part of application No. 11/965,441, filed on Dec. 27, 2007, now Pat. No. 7,918,749, which is a continuation of application No. 11/518,955, filed on Sep. 12, 2006, now Pat. No. 7,335,115.

(51) Int. Cl.
*A63B 37/06* (2006.01)

(52) U.S. Cl.
USPC .......................................................... 473/376

(58) Field of Classification Search
USPC .......................................................... 473/376
See application file for complete search history.

(56) References Cited

U.S. PATENT DOCUMENTS

| | | | |
|---|---|---|---|
| 5,772,531 A | 6/1998 | Ohsumi et al. | |
| 5,816,937 A | 10/1998 | Shimosaka et al. | |
| 5,980,396 A | 11/1999 | Moriyama et al. | |
| 6,045,460 A | 4/2000 | Hayashi et al. | |
| 6,117,025 A | 9/2000 | Sullivan | |
| 6,123,630 A | 9/2000 | Hayashi et al. | |
| 6,152,834 A | 11/2000 | Sullivan | |
| 6,231,461 B1 | 5/2001 | Moriyama et al. | |
| 6,248,027 B1 | 6/2001 | Hayashi et al. | |
| 6,394,914 B1 | 5/2002 | Sullivan | |
| 6,468,169 B1 | 10/2002 | Hayashi et al. | |
| 6,533,683 B2 | 3/2003 | Watanabe | |
| 6,592,470 B2 | 7/2003 | Watanabe et al. | |
| 6,663,507 B1 | 12/2003 | Watanabe et al. | |
| 6,679,791 B2 | 1/2004 | Watanabe | |
| 6,702,694 B1 | 3/2004 | Watanabe | |

(Continued)

FOREIGN PATENT DOCUMENTS

| | | |
|---|---|---|
| JP | 9-248351 A | 9/1997 |
| JP | 10-127818 A | 5/1998 |

(Continued)

*Primary Examiner* — Raeann Gorden
(74) *Attorney, Agent, or Firm* — Sughrue Mion, PLLC

(57) ABSTRACT

A multi-piece solid golf ball comprising a core, an envelope layer encasing the core, an intermediate layer encasing the envelope layer, and a cover which encases the intermediate layer and has formed on a surface thereof a plurality of dimples, wherein the core is made primarily of a rubber material and has a diameter of at least 31 mm, the envelope layer and intermediate layer are each made primarily of the same or different resin materials and the cover is made primarily of polyurethane; intermediate layer and cover have an optimized thickness relationship; the core, envelope layer, intermediate layer and cover have optimized hardness relationships; and the core surface and core center have a large hardness difference therebetween. The golf ball has excellent flight performance and controllability acceptable to professionals and other skilled golfers, while also having excellent durability to cracking upon repeated impact and excellent scuff resistance.

29 Claims, 2 Drawing Sheets

(56) References Cited

U.S. PATENT DOCUMENTS

| | | |
|---|---|---|
| 6,786,838 B2 | 9/2004 | Sullivan et al. |
| 6,814,676 B2 | 11/2004 | Watanabe et al. |
| 6,815,507 B2 | 11/2004 | Ohama |
| 6,981,925 B2 | 1/2006 | Shimizu et al. |
| 7,335,115 B1 * | 2/2008 | Watanabe et al. ............. 473/376 |
| 7,918,749 B2 * | 4/2011 | Watanabe et al. ............. 473/376 |
| 2005/0075196 A1 | 4/2005 | Shimizu et al. |

FOREIGN PATENT DOCUMENTS

| | | |
|---|---|---|
| JP | 10-127819 A | 5/1998 |
| JP | 10-295852 A | 11/1998 |
| JP | 10-328325 A | 12/1998 |
| JP | 10-328326 A | 12/1998 |
| JP | 10-328327 A | 12/1998 |
| JP | 10-328328 A | 12/1998 |
| JP | 11-164912 A | 6/1999 |
| JP | 11-35633 A | 9/1999 |
| JP | 11-4916 A | 11/1999 |
| JP | 2002-293996 A | 10/2002 |
| JP | 2002355341 A | 12/2002 |
| JP | 2004-180822 A | 7/2004 |
| JP | 2005111246 A | 4/2005 |

* cited by examiner

MULTI-PIECE SOLID GOLF BALL

CROSS REFERENCE TO RELATED APPLICATION

This application is a continuation-in-part of copending application Ser. No. 11/965,441 filed on Dec. 27, 2007, which is a continuation of application Ser. No. 11/518,955 filed Sep. 12, 2006, issued as U.S. Pat. No. 7,335,115, the entire contents of each of which are hereby incorporated by reference.

BACKGROUND OF THE INVENTION

The present invention relates to a multi-piece solid golf ball composed of a core, an envelope layer, an intermediate layer and a cover that have been formed as successive layers. More specifically, the invention relates to a multi-piece solid golf ball for professionals and other skilled golfers which is endowed with an excellent flight performance and good controllability.

A variety of golf balls have hitherto been developed for professionals and other skilled golfers. Of these, multi-piece solid golf balls in which the hardness relationship between an intermediate layer encasing the core and the cover layer has been optimized are in wide use because they achieve both a superior distance in the high head speed range and good controllability on shots taken with an iron and on approach shots. Another important concern is the proper selection of thicknesses and hardnesses for the respective layers of the golf ball in order to optimize not only flight performance, but also the feel of the ball when played and the spin rate of the ball after being struck with the club, particularly given the large influence of the spin rate on control of the ball. A further key concern in ball development, arising from the desire that golf balls also have durability under repeated impact and scuff resistance against burr formation on the surface of the ball when repeatedly played with different types of clubs, is how best to protect the ball from external factors.

The three-piece solid golf balls having an outer cover layer formed primarily of a thermoplastic polyurethane which are disclosed in U.S. Pat. No. 6,592,470, U.S. Pat. No. 6,679,791, U.S. Pat. No. 6,533,683, U.S. Pat. No. 6,814,676, U.S. Pat. No. 6,663,507 and U.S. Pat. No. 6,702,694 were intended to meet such a need. However, because this golf ball does not have a sufficiently reduced spin rate when hit with a driver, it is often unable to deliver a distance that is acceptable to professionals and other skilled golfers.

Meanwhile, efforts to improve the flight and other performance characteristics of golf balls have led to the development of balls having a four-layer construction, i.e., a core encased by three intermediate or cover layers, that allows the ball construction to be varied among the several layers at the interior. Such golf balls have been disclosed in, for example, JP-A 9-248351, JP-A 10-127818, JP-A 10-127819, JP-A 10-295852, JP-A 10-328325, JP-A 10-328326, JP-A 10-328327, JP-A 10-328328, JP-A 11-4916 and JP-A 2004-180822.

Yet, as golf balls for the skilled golfer, the above balls provide a poor balance of distance and controllability or fall short in terms of achieving a lower spin rate on shots with a driver, thus limiting the degree to which the total distance can be increased. Moreover, with these golf balls, it has been difficult to achieve in the same ball a good spin rate-lowering effect, good rebound and good durability.

SUMMARY OF THE INVENTION

It is therefore an object of the present invention to provide a multi-piece solid golf ball which has a flight performance and controllability that are fully acceptable to professionals and other skilled golfers, while also having an excellent durability to cracking on repeated impact and an excellent scuff resistance.

The present invention employs, as the basic construction in golf ball design, an outermost layer made of polyurethane and a multilayer structure of three or more outer layers (envelope layer/intermediate layer/cover) encasing the core. By making the cover of polyurethane, which is relatively soft, a spin performance on approach shots that is acceptable to professionals and other skilled golfers and a high scuff resistance can be obtained. By making the envelope layer of a material composed primarily of a specific resin mixture, a lower spin rate on shots with a number one wood (W#1) and a good durability on repeated impact are obtained. Moreover, by designing a ball in which the envelope layer, the intermediate layer and the cover have thicknesses which satisfy the relationship cover thickness<intermediate layer thickness, and the core, envelope layer, intermediate layer and cover have hardness relationships which satisfy the following three conditions:

core surface hardness≤envelope layer surface hardness　　(1)

cover material hardness<intermediate layer material hardness　　(2)

core surface hardness−core center hardness (JIS-C)≥11,　　(3)

the ball can be imparted with a lower spin rate on full shots with a driver or iron, enabling a good distance to be achieved that is acceptable to professionals and other skilled golfers, in addition to which the ball can be imparted with an excellent controllability in the short game.

In other words, the golf ball of the invention, when used by professionals and other skilled golfers, is able to resolve the above-described problems in the prior art due to the synergistic effects of the materials making up the respective layers of the ball and the hardness relationships therebetween. That is, the golf ball of the invention provides a fully acceptable flight performance and controllability, in addition to which it exhibits an excellent durability to cracking on repeated impact and excellent scuff resistance, effects which were entirely unanticipated. The inventors, having thus found that the technical challenges recited above can be overcome by the foregoing arrangement, ultimately arrived at the present invention.

Accordingly, the invention provides the following multi-piece solid golf balls.

[1] A multi-piece solid golf ball comprising a core, an envelope layer encasing the core, an intermediate layer encasing the envelope layer, and a cover which encases the intermediate layer and has formed on a surface thereof a plurality of dimples, wherein the core is made primarily of a rubber material and has a diameter of at least 31 mm, the envelope layer and intermediate layer are each made primarily of the same or different resin materials and the cover is made primarily of polyurethane, the material hardness of the cover is softer than the material hardness of the intermediate layer by the hardness difference of at least 1 but less than 40 in Durometer D hardness units; the envelope layer, intermediate layer and cover have thicknesses which satisfy the relationship cover thickness<intermediate layer thickness;

and the core, envelope layer, intermediate layer and cover have hardness relationships which satisfy the following three conditions:

core surface hardness≤envelope layer surface hardness, (1)

cover material hardness<intermediate layer material hardness, and (2)

core surface hardness−core center hardness (JIS-C)≥11. (3)

[2] The multi-piece solid golf ball of [1] above, wherein the core, envelope layer, intermediate layer and cover have hardnesses which satisfy the relationship core surface hardness≤envelope layer surface hardness<intermediate layer material hardness>cover material hardness.

[3] The multi-piece solid golf ball of [1], wherein the resin material making up the envelope layer is a mixture comprising, in admixture,
a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
(e) a non-ionomeric thermoplastic elastomer in a weight ratio between 100:0 and 50:50.

[4] The multi-piece solid golf ball of [1] above, wherein the resin material making up the envelope layer is a mixture comprising:
100 parts by weight of a resin component composed of, in admixture,
a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
(e) a non-ionomeric thermoplastic elastomer in a weight ratio between 100:0 and 50:50;
(c) 5 to 80 parts by weight of a fatty acid and/or fatty acid derivative having a molecular weight of 280 to 1500; and
(d) 0.1 to 10 parts by weight of a basic inorganic metal compound capable of neutralizing un-neutralized acid groups in the base resin and component (c).

[5] The multi-piece solid golf ball of [1] above, wherein the resin material making up the cover is a material composed primarily of a heated mixture of
(A) a thermoplastic polyurethane material, and
(B) an isocyanate mixture of (b-1) an isocyanate compound having at least two isocyanate groups as functional groups per molecule, dispersed in (b-2) a thermoplastic resin which is substantially non-reactive with isocyanate.

[6] The multi-piece solid golf ball of [1] above, wherein the core material is composed of, in admixture, a rubber base, sulfur and an organosulfur compound.

[7] The multi-piece solid golf ball of [1] above, wherein the envelope layer, intermediate layer and cover have thicknesses which satisfy the relationship:

cover thickness<intermediate layer thickness≤envelope layer thickness.

[8] The multi-piece solid golf ball of [1] above, wherein the core has hardness which satisfy the relationship core surface hardness−core center hardness (JIS-C)≥15.

[9] The multi-piece solid golf ball of [8] above, wherein the core has hardness which satisfy the relationship core surface hardness−core center hardness (JIS-C)≥20.

[10] The multi-piece solid golf ball of [1] above, wherein the diameter of the core is 31 to 34.96 mm.
[11] The multi-piece solid golf ball of [1] above, wherein the number of the dimples is at least 280 but not more than 360.
[12] The multi-piece solid golf ball of [1] above, wherein the number of the dimples is at least 300 but not more than 350.
[13] The multi-piece solid golf ball of [1] above, wherein the diameter of the dimples is set to at least 2.5 mm but not more than 6.5 mm.
[14] The multi-piece solid golf ball of [1] above, wherein the depth of the dimples is set to at least 0.08 mm but not more than 0.30 mm.
[15] The multi-piece solid golf ball of [1] above, wherein the dimple coverage on the spherical surface of the golf ball, which is the sum of the individual dimple surface areas, each defined by the border of the flat plane circumscribed by the edge of a dimple, expressed as a ratio (SR) with respect to the spherical surface area of the ball were it to be free of dimples, is at least 60% but not more than 90%.
[16] The multi-piece solid golf ball of [1] above, wherein the value V0 obtained by dividing the spatial volume of each dimple below the flat plane circumscribed by the edge of that dimple by the volume of a cylinder whose base is the flat plane and whose height from the base to the maximum depth of the dimple is at least 0.35 but more than 0.80.
[17] The multi-piece solid golf ball of [1] above, wherein the VR value, which is the sum of the volumes of individual dimples formed below flat planes circumscribed by the dimple edges, as a percentage of the volume of the ball sphere were it to have no dimples thereon, is at least 0.6% but not more than 1.0%.
[18] The multi-piece solid golf ball of [1] above, wherein the intermediate layer material is composed primarily of, in admixture, both a zinc-neutralized ionomer resin and a sodium-neutralized ionomer resin in which the mixing ratio, expressed as the weight ratio of zinc-neutralized resin to sodium-neutralized resin is from 25/75 to 75/25.
[19] A multi-piece solid golf ball comprising a core, an envelope layer encasing the core, an intermediate layer encasing the envelope layer, and a cover which encases the intermediate layer and has formed on a surface thereof a plurality of dimples, wherein the core is made primarily of a rubber material and has a diameter of at least 31 mm, the envelope layer and intermediate layer are each made primarily of the same or different resin materials and the cover is made primarily of polyurethane, the material hardness of the cover is softer than the material hardness of the intermediate layer by the hardness difference of at least 1 but less than 40 in Durometer D hardness units; the envelope layer, intermediate layer and cover have thicknesses which satisfy the relationship cover thickness<intermediate layer thickness≤envelope layer thickness;

and the core, envelope layer, intermediate layer and cover have hardness relationships which satisfy the following three conditions:

cover material hardness<intermediate layer material hardness, and (2)

core surface hardness−core center hardness (JIS-C)≥11. (3)

[20] The multi-piece solid golf ball of [19] above, wherein the resin material making up the envelope layer is a mixture comprising, in admixture, a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and (e) a non-ionomeric thermoplastic elastomer in a weight ratio between 100:0 and 50:50.

[21] The multi-piece solid golf ball of [19] above, wherein the resin material making up the envelope layer is a mixture comprising:

100 parts by weight of a resin component composed of, in admixture, a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and (e) a non-ionomeric thermoplastic elastomer in a weight ratio between 100:0 and 50:50;

(c) 5 to 80 parts by weight of a fatty acid and/or fatty acid derivative having a molecular weight of 280 to 1500; and (d) 0.1 to 10 parts by weight of a basic inorganic metal compound capable of neutralizing un-neutralized acid groups in the base resin and component (c).

[22] The multi-piece solid golf ball of [19] above, wherein the resin material making up the cover is a material composed primarily of a heated mixture of (A) a thermoplastic polyurethane material, and (B) an isocyanate mixture of (b-1) an isocyanate compound having at least two isocyanate groups as functional groups per molecule, dispersed in (b-2) a thermoplastic resin which is substantially non-reactive with isocyanate.

[23] The multi-piece solid golf ball of [19] above, wherein the core material is composed of, in admixture, a rubber base, sulfur and an organosulfur compound.

[24] The multi-piece solid golf ball of [19] above, wherein the core has hardness which satisfy the relationship core surface hardness−core center hardness (JIS-C)≥15.

[25] The multi-piece solid golf ball of [19] above, wherein the core has hardness which satisfy the relationship core surface hardness−core center hardness (JIS-C)≥20.

[26] The multi-piece solid golf ball of [19] above, wherein the core and envelope layer have hardnesses which satisfy the relationship core surface hardness≤envelope layer surface hardness.

[27] The multi-piece solid golf ball of [19] above, wherein the diameter of the core is 31 to 34.96 mm.

[28] The multi-piece solid golf ball of [19] above, wherein the number of the dimples is at least 300 but not more than 350; the diameter of the dimples is set to at least 2.5 mm but not more than 6.5 mm; the depth of the dimples is set to at least 0.08 mm but not more than 0.30 mm; the dimple coverage on the spherical surface of the golf ball, which is the sum of the individual dimple surface areas, each defined by the border of the flat plane circumscribed by the edge of a dimple, expressed as a ratio (SR) with respect to the spherical surface area of the ball were it to be free of dimples, is at least 60% but not more than 90%; the value V0 obtained by dividing the spatial volume of each dimple below the flat plane circumscribed by the edge of that dimple by the volume of a cylinder whose base is the flat plane and whose height from the base to the maximum depth of the dimple is at least 0.35 but more than 0.80; the VR value, which is the sum of the volumes of individual dimples formed below flat planes circumscribed by the dimple edges, as a percentage of the volume of the ball sphere were it to have no dimples thereon, is at least 0.6% but not more than 1.0%.

[29] The multi-piece solid golf ball of [19] above, wherein the intermediate layer material is composed primarily of, in admixture, both a zinc-neutralized ionomer resin and a sodium-neutralized ionomer resin in which the mixing ratio, expressed as the weight ratio of zinc-neutralized resin to sodium-neutralized resin is from 25/75 to 75/25.

BRIEF DESCRIPTION OF THE DIAGRAMS

DETAILED DESCRIPTION OF THE INVENTION

Figure 1:
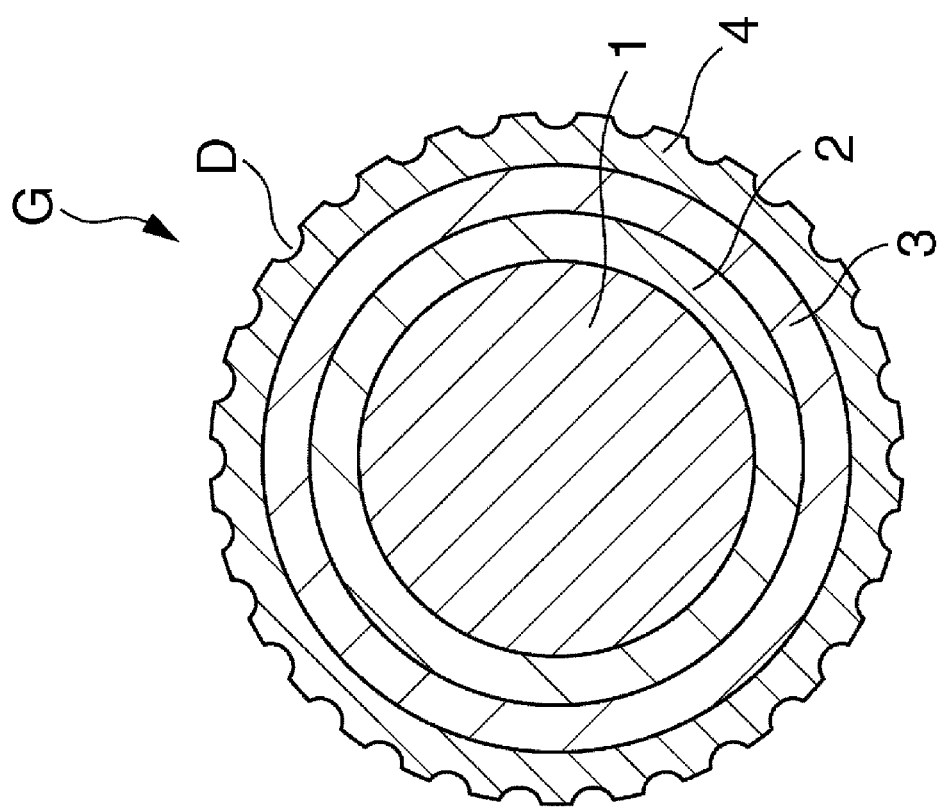
FIG. 1 is a schematic sectional view showing a multi-piece solid golf ball (4-layer construction) according to the invention.
Figure 2:
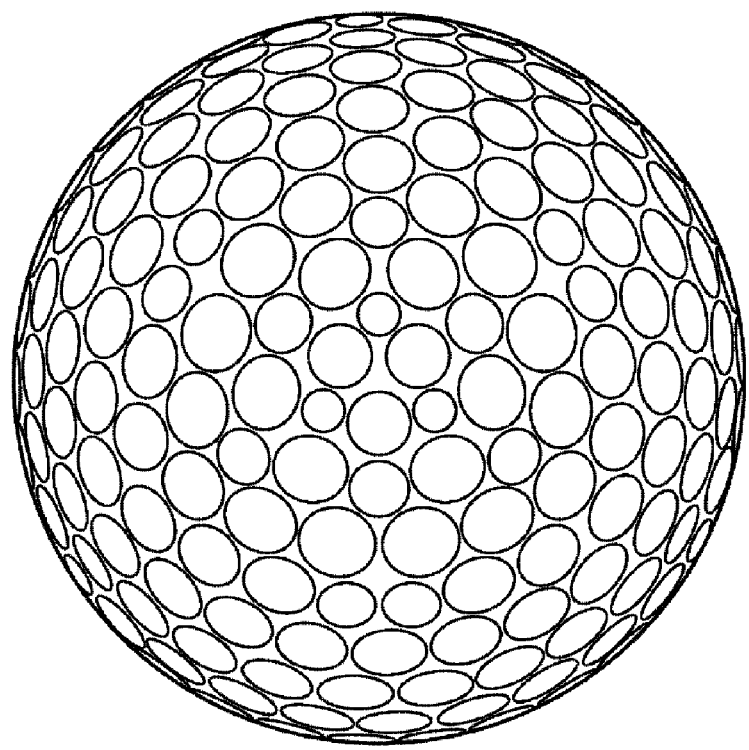
FIG. 2 is a top view of a golf ball showing an arrangement of dimples that may be used in the embodiments of the invention.

The invention is described more fully below. The multi-piece solid golf ball of the present invention, as shown in FIG. 1, is a golf ball G having four or more layers, including a core 1, an envelope layer 2 encasing the core, an intermediate layer 3 encasing the envelope layer, and a cover 4 encasing the intermediate layer. The cover 4 typically has a large number of dimples D formed on the surface thereof. The core 1 and the intermediate layer 3 are not limited to single layers, and may each be formed of a plurality of two more layers.

The core diameter in the invention is not subject to any particular limitation, but is preferably between 31 mm and 38 mm, more preferably at least 32.5 mm but not more than 37 mm, and most preferably at least 34 mm but not more than 36 mm. A core diameter outside this range will lower the initial velocity of the ball or yield a less than adequate spin rate-lowering effect after the ball is hit, as a result of which an increased distance may not be achieved.

The center hardness of the core, while not subject to any particular limitation, preferably has a JIS-C hardness of at least 54 but not more than 72, more preferably at least 57 but not more than 68, and most preferably at least 60 but not more than 65. Below the above range, the rebound characteristics of the core may be inadequate, as a result of which an increased distance may not be achieved, and the durability to cracking on repeated impact may worsen. Conversely, at a core center hardness higher than the above range, the ball may have an excessively hard feel on full shots and the spin rate may be too high, as a result of which an increased distance may not be achieved.

The surface hardness of the core, while not subject to any particular limitation, preferably has a Durometer D hardness (the value measured with a type D durometer based on ASTM D2240; the same applies to the Durometer D hardnesses mentioned below for the respective layers) of at least 45 but not more than 65, more preferably at least 50 but not more than 60, and even more preferably at least 52 but not more than 58. Below the above range, the rebound characteristics of the core may be inadequate, as a result of which an increased distance may not be achieved, and the durability to cracking on repeated impact may worsen. Conversely, at a core surface hardness higher than the above range, the ball may have an excessively hard feel on full shots with a driver and the spin rate may be too high, as a result of which an increased distance may not be achieved.

In the practice of the invention, it is critical that the core have a surface hardness which is higher than the hardness at the center of the core, with the difference therebetween being at least 11 JIS-C units, preferably at least 15 JIS-C units, and more preferably at least 20 JIS-C units. If the difference is too small, the spin rate-lowering effect on full shots with a driver or the like may be insufficient, causing the ball to describe a high trajectory, as a result of which an increased distance may not be achieved.

The deflection of the core when subjected to loading, i.e., the deflection of the core when compressed from an initial load of 98 N (10 kgf) to a final load of 1,275 N (130 kgf), while not subject to any particular limitation, is preferably set within a range of 2.0 mm to 5.0 mm, more preferably 2.3 mm to 4.5 mm, and even more preferably 2.6 mm to 4.0 mm. If this value is too high, the core may lack sufficient rebound, which may result in a less than adequate distance, or the durability of the ball to cracking on repeated impact may worsen. On the other hand, if this value is too low, the ball may have an excessively hard feel on full shots with a driver, and the spin rate may be too high, as a result of which an increased distance may not be achieved.

The core having the above-described surface hardness and deflection is made primarily of a rubber component. For example, the core may be made of a rubber composition containing, in addition to the rubber component, a co-crosslinking agent, an organic peroxide, an inert filler, an organosulfur compound, sulfur (i.e., elemental sulfur) and the like. It is preferable to use polybutadiene as the base rubber of this rubber composition.

It is desirable for the polybutadiene serving as the rubber component to have a cis-1,4-bond content on the polymer chain of at least 60 wt %, preferably at least 80 wt %, more preferably at least 90 wt %, and most preferably at least 95 wt %. Too low a cis-1,4-bond content among the bonds on the molecule may lead to a lower resilience.

Moreover, the polybutadiene has a 1,2-vinyl bond content on the polymer chain of preferably not more than 2%, more preferably not more than 1.7%, and even more preferably not more than 1.5%. Too high a 1,2-vinyl bond content may lead to a lower resilience.

To obtain a molded and vulcanized rubber composition of good resilience, the polybutadiene used therein is preferably one synthesized with a rare-earth catalyst or a Group VIII metal compound catalyst. Polybutadiene synthesized with a rare-earth catalyst is especially preferred.

Such rare-earth catalysts are not subject to any particular limitation. Exemplary rare-earth catalysts include those made up of a combination of a lanthanide series rare-earth compound with an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Suitable examples of such rare-earth catalysts include those mentioned in JP-A 11-35633, JP-A 11-164912 and JP-A 2002-293996.

To enhance the resilience, it is preferable for the polybutadiene synthesized using the lanthanide series rare-earth compound catalyst to account for at least 10 wt %, preferably at least 20 wt %, and more preferably at least 40 wt %, of the rubber components.

Rubber components other than the above-described polybutadiene may be included in the base rubber insofar as the effects of the invention are not compromised. Illustrative examples of suitable rubber components other than the above-described polybutadiene include other polybutadienes, and other diene rubbers, such as styrene-butadiene rubber, natural rubber, isoprene rubber and ethylene-propylene-diene rubber.

Examples of co-crosslinking agents include unsaturated carboxylic acids and the metal salts of unsaturated carboxylic acids.

Specific examples of unsaturated carboxylic acids include acrylic acid, methacrylic acid, maleic acid and fumaric acid. Acrylic acid and methacrylic acid are especially preferred.

The metal salts of unsaturated carboxylic acids, while not subject to any particular limitation, are exemplified by the above-mentioned unsaturated carboxylic acids neutralized with a desired metal ion. Specific examples include the zinc and magnesium salts of methacrylic acid and acrylic acid. The use of zinc acrylate is especially preferred.

The unsaturated carboxylic acid and/or metal salt thereof is included in an amount, per 100 parts by weight of the base rubber, of generally at least 10 parts by weight, preferably at least 15 parts by weight, and more preferably at least 20 parts by weight, but generally not more than 60 parts by weight, preferably not more than 50 parts by weight, more preferably not more than 45 parts by weight, and most preferably not more than 40 parts by weight. Too much may make the core too hard, giving the ball an unpleasant feel on impact, whereas too little may lower the rebound.

The organic peroxide may be a commercially available product, suitable examples of which include Percumyl D (produced by NOF Corporation), Perhexa 3M (NOF Corporation), and Luperco 231XL (Atochem Co.). These may be used singly or as a combination of two or more thereof.

The amount of organic peroxide included per 100 parts by weight of the base rubber is preferably at least 0.1 part by weight, more preferably at least 0.3 part by weight, even more preferably at least 0.5 part by weight, and most preferably at least 1 part by weight, but preferably not more than 6 parts by weight, more preferably not more than 5 parts by weight, even more preferably not more than 4 parts by weight, and most preferably not more than 3 parts by weight. Too much or too little organic peroxide may make it impossible to achieve a ball having a good feel on impact, durability and rebound.

Examples of suitable inert fillers include zinc oxide, barium sulfate and calcium carbonate. These may be used singly or as a combination of two or more thereof.

The amount of inert filler included per 100 parts by weight of the base rubber is preferably at least 1 part by weight, and more preferably at least 5 parts by weight, but preferably not more than 60 parts by weight, more preferably not more than 50 parts by weight, and even more preferably not more than 40 parts by weight. Too much or too little inert filler may make it impossible to achieve a proper weight and a good rebound.

In addition, an antioxidant may be included if necessary. Illustrative examples of suitable commercial antioxidants include Nocrac NS-6, Nocrac NS-30 (both available from Ouchi Shinko Chemical Industry Co., Ltd.), and Yoshinox 425 (available from Yoshitomi Pharmaceutical Industries, Ltd.). These may be used singly or as a combination of two or more thereof.

The amount of antioxidant included per 100 parts by weight of the base rubber is preferably 0 or more part by weight, more preferably at least 0.05 part by weight, and even more preferably at least 0.1 part by weight, but preferably not more than 3 parts by weight, more preferably not more than 2 parts by weight, even more preferably not more than 1 part by weight, and most preferably not more than 0.5 part by weight. Too much or too little antioxidant may make it impossible to achieve a good rebound and durability.

To enhance the rebound of the golf ball and increase its initial velocity, it is preferable to include within the core an organosulfur compound.

No particular limitation is imposed on the organosulfur compound, provided it improves the rebound of the golf ball. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

It is recommended that the amount of the organosulfur compound included per 100 parts by weight of the base rubber be preferably at least 0.05 part by weight, and more preferably at least 0.1 part by weight, but preferably not more than 5 parts by weight, more preferably not more than 4 parts by weight, even more preferably not more than 3 parts by weight, and most preferably not more than 2.5 parts by weight. If too much organosulfur compound is included, the effects of addition may peak so that further addition has no apparent effect, whereas the use of too little organosulfur compound may fail to confer the effects of such addition to a sufficient degree.

It is desirable to include sulfur (elemental sulfur) in the base rubber of which the core is primarily made. The sulfur may be in the form of a powder, such as that produced by Tsurumi Chemical Industry Co., Ltd. under the trade name "Z Sulfur." The amount of sulfur included per 100 parts by weight of the base rubber in the core is preferably at least 0.05 part by weight, more preferably at least 0.07 part by weight, and even more preferably at least 0.09 part by weight, but preferably not more than 0.5 part by weight, more preferably not more than 0.3 part by weight, and even more preferably not more than 0.2 part by weight. If too little sulfur is included, it may not be possible to achieve at least a certain minimum hardness difference between the surface of the core and the center of the core. On the other hand, too much sulfur may lower the rebound resilience and prevent the ball from achieving a sufficient distance.

Next, the envelope layer is described.

The envelope layer has a material hardness, expressed as the Durometer D hardness, which, while not subject to any particular limitation, is preferably at least 40 but not more than 62, more preferably at least 47 but not more than 60, and even more preferably at least 53 but not more than 58. If the envelope layer material is softer than the above range, the ball may have too much spin receptivity on full shots, as a result of which an increased distance may not be achieved. On the other hand, if this material is harder than the above range, the durability of the ball to cracking under repeated impact may worsen and the ball may have too hard a feel when played. The envelope layer has a thickness which, while not subject to any particular limitation, is preferably at least 1.0 mm but not more than 4.0 mm, more preferably at least 1.2 mm but not more than 3.0 mm, and even more preferably at least 1.4 mm but not more than 2.0 mm. Outside of this range, the spin rate-lowering effect on full shots with a driver (W#1) or an iron may be inadequate, as a result of which an increased distance may not be achieved.

The term "material hardness" used above refers to the hardness of the envelope layer material itself, not the hardness at the surface of the spherical body composed of the core encased by the envelope layer. Specifically, the material hardness is the sheet hardness obtained by molding the envelope layer material into a sheet of a given thickness as stipulated in a hardness standard, and measuring the hardness of the resulting molded sheet. The same applies to the material hardness of the subsequently described intermediate layer and cover.

The envelope layer has a surface hardness, expressed as the Durometer D hardness, which, while not subject to any particular limitation, is preferably at least 50 but not more than 70, more preferably at least 53 but not more than 67, and even more preferably at least 55 but not more than 63. At a surface hardness lower than this range, the ball may have too much spin receptivity on full shots, as a result of which an increased distance may not be achieved. On the other hand, if the surface hardness is higher than the above range, the durability of the ball to cracking under repeated impact may worsen and the ball may have too hard a feel when played. Although not subject to any particular limitation, it is preferable for the surface of the envelope layer to be softer than the surface of the intermediate layer. While no particular limitation is imposed on the degree to which it is softer (hardness difference), the difference in Durometer D hardness is preferably at least 3 but not more than 25, more preferably at least 5 but not more than 18, and even more preferably at least 7 but not more than 15. Outside of this range, if the surface of the envelope layer is too much softer than the surface of the intermediate layer, the rebound of the ball may decrease or the spin rate may become excessive, as a result of which an increased distance may not be achieved.

It is critical for the surface of the envelope layer to be as hard as or harder than the surface of the core. The hardness difference between the surface of the envelope layer and the surface of the core, expressed in terms of Durometer D hardness, is preferably at least 0 but not more than 12, more preferably at least 0 but not more than 10, and even more preferably at least 0 but not more than 8. If the surface of the envelope layer is instead softer than the core surface, the spin rate-lowering effect on shots with a driver will be inadequate, as a result of which an increased distance will not be achieved. Conversely, if the surface of the envelope layer is too much harder than the core surface, the feel of the ball on full shots may be too hard and the durability of the ball to cracking on repeated impact may worsen.

The envelope layer in the invention is made primarily of a resin material. The resin material of the envelope layer, while not subject to any particular limitation, is preferably one which includes as an essential component a base resin of (a) an olefin-unsaturated carboxylic acid random copolymer and/or a metal ion neutralization product of an olefin-unsaturated carboxylic acid random copolymer mixed in a specific ratio with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer.

The olefin in the above base resin, for either component (a) or component (b), has a number of carbons which is generally at least 2 but not more than 8, and preferably not more than 6. Specific examples include ethylene, propylene, butene, pentene, hexene, heptene and octene. Ethylene is especially preferred.

Examples of unsaturated carboxylic acids include acrylic acid, methacrylic acid, maleic acid and fumaric acid. Acrylic acid and methacrylic acid are especially preferred.

Moreover, the unsaturated carboxylic acid ester is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid random copolymer of component (a) and the olefin-unsaturated carboxylic acid-unsaturated carboxylic acid ester ternary random copolymer of component (b) (the copolymers in components (a) and (b) are referred to collectively below as "the random copolymers") can each be obtained by preparing the above-mentioned materials and carrying out random copolymerization by a known method.

It is recommended that the above random copolymers have controlled contents of unsaturated carboxylic acid (acid contents). Here, it is recommended that the content of unsaturated carboxylic acid present in the random copolymer serving as component (a) is generally at least 4 wt %, preferably at least 6 wt %, more preferably at least 8 wt %, and even more preferably at least 10 wt %, but not more than 30 wt %, preferably not more than 20 wt %, even more preferably not more than 18 wt %, and most preferably not more than 15 wt %.

Similarly, it is recommended that the content of unsaturated carboxylic acid present in the random copolymer serving as component (b) is generally at least 4 wt %, preferably at least 6 wt %, and more preferably at least 8 wt %, but not more than 15 wt %, preferably not more than 12 wt %, and even more preferably not more than 10 wt %. If the acid content of the random copolymer is too low, the rebound may decrease, whereas if it is too high, the processability of the envelope layer-forming resin material may decrease.

The metal ion neutralization product of an olefin-unsaturated carboxylic acid random copolymer of component (a) and the metal ion neutralization product of an olefin-unsaturated carboxylic acid-unsaturated carboxylic acid ester ternary random copolymer of component (b) (the metal ion neutralization products of the copolymers in components (a) and (b) are referred to collectively below as "the metal ion neutralization products of the random copolymers") can be obtained by neutralizing some of the acid groups on the random copolymers with metal ions.

Illustrative examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, preferred use can be made of, for example, $Na^+$, $Li^+$, $Zn^{++}$ and $Mg^{++}$. To improve resilience, the use of $Na^+$ is even more preferred.

The above metal ion neutralization products of the random copolymers may be obtained by neutralizing the random copolymers with the foregoing metal ions. For example, use may be made of a method in which neutralization is carried out with a compound such as a formate, acetate, nitrate, carbonate, hydrogencarbonate, oxide, hydroxide or alkoxide of the above-mentioned metal ions. No particular limitation is imposed on the degree of neutralization of the random copolymer by these metal ions.

Sodium ion-neutralized ionomer resins may be suitably used as the above metal ion neutralization products of the random copolymers to increase the melt flow rate of the material. This facilitates adjustment to the subsequently described optimal melt flow rate, enabling the moldability to be improved.

Commercially available products may be used as the base resins of above components (a) and (b). Illustrative examples of the random copolymer in component (a) include Nucrel 1560, Nucrel 1214 and Nucrel 1035 (all products of DuPont-Mitsui Polychemicals Co., Ltd.), and Escor 5200, Escor 5100 and Escor 5000 (all products of ExxonMobil Chemical). Illustrative examples of the random copolymer in component (b) include Nucrel AN 4311 and Nucrel AN 4318 (both products of DuPont-Mitsui Polychemicals Co., Ltd.), and Escor ATX325, Escor ATX320 and Escor ATX310 (all products of ExxonMobil Chemical).

Illustrative examples of the metal ion neutralization product of the random copolymer in component (a) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E.I. DuPont de Nemours & Co.), and Iotek 3110 and Iotek 4200 (both products of ExxonMobil Chemical). Illustrative examples of the metal ion neutralization product of the random copolymer in component (b) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). Sodium-neutralized ionomer resins that are suitable as the metal ion neutralization product of the random copolymer include Himilan 1605, Himilan 1601 and Himilan 1555.

When preparing the above-described base resin, component (a) and component (b) must be admixed in a weight ratio of generally between 100:0 and 0:100, preferably between 100:0 and 25:75, more preferably between 100:0 and 50:50, even more preferably between 100:0 and 75:25, and most preferably 100:0. If too little component (a) is included, the molded material obtained therefrom may have a decreased resilience.

In addition, the processability of the base resin can be further improved by also adjusting the ratio in which the random copolymers and the metal ion neutralization products of the random copolymers are admixed when preparing the base resin as described above. It is recommended that the weight ratio of the random copolymer to the metal ion neutralization product of the random copolymer be generally between 0:100 and 60:40, preferably between 0:100 and 40:60, more preferably between 0:100 and 20:80, and most preferably 0:100. The addition of too much random copolymer may lower the processability during mixing.

Component (e) described below may be added to the base resin. Component (e) is a non-ionomeric thermoplastic elastomer. The purpose of this component is to further improve the feel of the ball on impact and the rebound. Examples include olefin elastomers, styrene elastomers, polyester elastomers, urethane elastomers and polyamide elastomers. To further increase the rebound, it is preferable to use a polyester elastomer or an olefin elastomer. The use of an olefin elastomer composed of a thermoplastic block copolymer which includes crystalline polyethylene blocks as the hard segments is especially preferred.

A commercially available product may be used as component (e). Illustrative examples include Dynaron (JSR Corporation) and the polyester elastomer Hytrel (DuPont-Toray Co., Ltd.).

It is recommended that component (e) be included in an amount, per 100 parts by weight of the base resin of the invention, of generally at least 0 part by weight, preferably at least 5 parts by weight, more preferably at least 10 parts by weight, and most preferably at least 20 parts by weight, but not more than 100 parts by weight, preferably not more than 60 parts by weight, more preferably not more than 50 parts by weight, and most preferably not more than 40 parts by weight. Too much component (e) will lower the compatibility of the mixture, possibly resulting in a substantial decline in the durability of the golf ball.

Next, component (c) described below may be added to the base resin. Component (c) is a fatty acid or fatty acid derivative having a molecular weight of at least 280 but not more than 1500. Compared with the base resin, this component has a very low molecular weight and, by suitably adjusting the melt viscosity of the mixture, helps in particular to improve the flow properties. Component (c) includes a relatively high content of acid groups (or derivatives), and is capable of suppressing an excessive loss in resilience.

The fatty acid or fatty acid derivative of component (c) has a molecular weight of at least 280, preferably at least 300, more preferably at least 330, and even more preferably at least 360, but not more than 1,500, preferably not more than 1,000, even more preferably not more than 600, and most preferably not more than 500. If the molecular weight is too low, the heat resistance cannot be improved. On the other hand, if the molecular weight is too high, the flow properties cannot be improved.

The fatty acid or fatty acid derivative of component (c) may be an unsaturated fatty acid (or derivative thereof) containing a double bond or triple bond on the alkyl moiety, or it may be a saturated fatty acid (or derivative thereof) in which the bonds on the alkyl moiety are all single bonds. It is recommended that the number of carbons on the molecule be preferably at least 18, more preferably at least 20, even more preferably at least 22, and most preferably at least 24, but not more than 80, preferably not more than 60, more preferably not more than 40, and even more preferably not more than 30. Too few carbons may make it impossible to improve the heat resistance and may also make the acid group content so high as to diminish the flow-improving effect due to interactions with acid groups present in the base resin. On the other hand, too many carbons increases the molecular weight, as a result of which a distinct flow-improving effect may not appear.

Specific examples of the fatty acid of component (c) include stearic acid, 1,2-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

The fatty acid derivative of component (c) is exemplified by metallic soaps in which the proton on the acid group of the fatty acid has been replaced with a metal ion. Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component (c) include magnesium stearate, calcium stearate, zinc stearate, magnesium 1,2-hydroxystearate, calcium 1,2-hydroxystearate, zinc 1,2-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Component (d) may be added as a basic inorganic metal compound capable of neutralizing acid groups in the base resin and in component (c). If component (d) is not included, when a metallic soap-modified ionomer resin (e.g., the metallic soap-modified ionomer resins cited in the above-mentioned patent publications) is used alone, the metallic soap and un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, if the fatty acid thus generated deposits on the surface of the molded material, it may substantially lower paint film adhesion and may have other undesirable effects such as lowering the resilience of the resulting molded material.

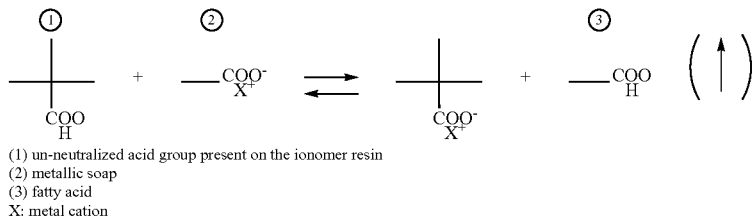

(1) un-neutralized acid group present on the ionomer resin
(2) metallic soap
(3) fatty acid
X: metal cation To solve this problem, the envelope layer-forming resin material may include also, as an essential component, a basic inorganic metal compound (d) which neutralizes the acid groups present in the base resin and component (c), in this way improving the resilience of the molded material.

That is, by including component (d) as an essential ingredient in the material, not only are the acid groups in the base resin and component (c) neutralized, through synergistic effects from the proper addition of each of these components it is possible as well to increase the thermal stability of the mixture and thus confer a good moldability, and also to enhance the resilience.

Here, it is recommended that the basic inorganic metal compound used as component (d) be a compound having a high reactivity with the base resin and containing no organic acids in the reaction by-products, enabling the degree of neutralization of the mixture to be increased without a loss of thermal stability.

Illustrative examples of the metal ions in the basic inorganic metal compound serving as component (d) include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, which have a high reactivity with the base resin, are more preferred. Calcium hydroxide is especially preferred.

Because the above-described resin material is arrived at by blending specific respective amounts of components (c) and (d) with the resin component, i.e., the base resin containing specific respective amounts of components (a) and (b) in combination with optional component (e), this material has excellent thermal stability, flow properties and moldability, and can impart the molded material with a markedly improved resilience.

Components (c) and (d) are included in respective amounts, per 100 parts by weight of the resin component suitably formulated from components (a), (b) and (e), of at least 5 parts by weight, preferably at least 10 parts by weight, more preferably at least 15 parts by weight, and even more preferably at least 18 parts by weight, but not more than 80 parts by weight, preferably not more than 40 parts by weight, more preferably not more than 25 parts by weight, and even more preferably not more than 22 parts by weight, of component (c); and at least 0.1 part by weight, preferably at least 0.5 part by weight, more preferably at least 1 part by weight, and even more preferably at least 2 parts by weight, but not more than 10 parts by weight, preferably not more than 8 parts by weight, more preferably not more than 6 parts by weight, and even more preferably not more than 5 parts by weight, of component (d). Too little component (c) lowers the melt viscosity, resulting in inferior processability, whereas too much lowers the durability. Too little component (d) fails to improve thermal stability and resilience, whereas too much instead lowers the heat resistance of the golf ball-forming material due to the presence of excess basic inorganic metal compound.

In the above-described resin material formulated from the respective above-indicated amounts of the resin component and components (c) and (d), it is recommended that at least 50 mol %, preferably at least 60 mol %, more preferably at least 70 mol %, and even more preferably at least 80 mol %, of the acid groups be neutralized. Such a high degree of neutralization makes it possible to more reliably suppress the exchange reactions that cause trouble when only a base resin and a fatty acid or fatty acid derivative are used as in the above-cited prior art, thus preventing the generation of fatty acid. As a result, there is obtained a resin material of substantially improved thermal stability and good processability which can provide molded products of much better resilience than prior-art ionomer resins.

"Degree of neutralization," as used above, refers to the degree of neutralization of acid groups present within the mixture of the base resin and the fatty acid or fatty acid derivative serving as component (c), and differs from the degree of neutralization of the ionomer resin itself when an ionomer resin is used as the metal ion neutralization product of a random copolymer in the base resin. A mixture according to the invention having a certain degree of neutralization, when compared with an ionomer resin alone having the same degree of neutralization, contains a very large number of metal ions. This large number of metal ions increases the density of ionic crosslinks which contribute to improved resilience, making it possible to confer the molded product with excellent resilience.

To more reliably achieve a material having both a high degree of neutralization and good flow properties, it is recommended that the acid groups in the above-described mixture be neutralized with transition metal ions and with alkali metal and/or alkaline earth metal ions. Although neutralization with transition metal ions provides a weaker ionic cohesion than neutralization with alkali metal and alkaline earth metal ions, the combined use of these different types of ions to neutralize acid groups in the mixture can substantially improve the flow properties.

It is recommended that the molar ratio between the transition metal ions and the alkali metal and/or alkaline earth metal ions be in a range of typically 10:90 to 90:10, preferably 20:80 to 80:20, more preferably 30:70 to 70:30, and most preferably 40:60 to 60:40. Too low a molar ratio of transition metal ions may fail to provide a sufficient flow-improving effect. On the other hand, too high a transition metal ion molar ratio may lower the resilience.

Examples of the metal ions include, but are not limited to, zinc ions as the transition metal ions and at least one type of ion selected from among sodium, lithium and magnesium ions as the alkali metal or alkaline earth metal ions.

A known method may be used to obtain a mixture in which the desired amount of acid groups have been neutralized with transition metal ions and alkali metal or alkaline earth metal ions. Specific examples of methods of neutralization with transition metal ions, particularly zinc ions, include methods which use zinc soaps as the fatty acid derivative, methods which use zinc ion neutralization products (e.g., a zinc ion-neutralized ionomer resin) when formulating components (a) and (b) as the base resin, and methods which use zinc compounds such as zinc oxide as the basic inorganic metal compound of component (d).

The resin material should preferably have a melt flow rate adjusted to ensure flow properties that are particularly suitable for injection molding, and thus improve moldability. Specifically, it is recommended that the melt flow rate (MFR), as measured according to JIS K7210 at a test temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but generally not more than 20 dg/min, preferably not more than 10 dg/min, more preferably not more than 5 dg/min, and even more preferably not more than 3 dg/min. Too high or low a melt flow rate may result in a substantial decline in processability.

Next, the intermediate layer is described.

The material from which the intermediate layer is formed has a hardness, expressed as the Durometer D hardness, which, while not subject to any particular limitation, is preferably at least 50 but not more than 70, more preferably at least 55 but not more than 66, and even more preferably at least 60 but not more than 63. If the intermediate layer material is softer than the above range, the ball may have too much spin receptivity on full shots, as a result of which an increased distance may not be attained. On the other hand, if this material is harder than the above range, the durability of the ball to cracking under repeated impact may worsen and the ball may have too hard a feel when played with a putter or on short approach shots. The intermediate layer has a thickness which, while not subject to any particular limitation, is preferably at least 0.7 mm but not more than 2.0 mm, more preferably at least 0.9 mm but not more than 1.7 mm, and even more preferably at least 1.1 mm but not more than 1.4 mm. Outside of this range, the spin rate-lowering effect on shots with a driver (W#1) may be inadequate, as a result of which an increased distance may not be achieved. Moreover, a thickness lower than the above range may worsen the durability to cracking on repeated impact or the low-temperature durability.

The intermediate layer may be made primarily of a resin material which is the same as or different from the above-described material used to form the envelope layer. An ionomer resin is especially preferred. Specific examples include sodium-neutralized ionomer resins available under the trade name designations Himilan 1605, Himilan 1601 and Surlyn 8120, and zinc-neutralized ionomer resins such as Himilan 1557 and Himilan 1706. These may be used singly or as a combination of two or more thereof.

An embodiment in which the intermediate layer material is composed primarily of, in admixture, both a zinc-neutralized ionomer resin and a sodium-neutralized ionomer resin is especially preferable for attaining the objects of the invention. The mixing ratio, expressed as the weight ratio of zinc-neutralized resin to sodium-neutralized resin, is generally from 25/75 to 75/25, preferably from 35/65 to 65/35, and more preferably from 45/55 to 55/45.

Outside of this range, the ball rebound may be too low, as a result of which the desired distance may not be achieved, the durability to repeated impact at normal temperature may worsen, and the durability to cracking at low temperatures (below 0° C.) may worsen.

The surface hardness of the intermediate layer, i.e., the surface hardness of the sphere composed of the core and the envelope layer enclosed by the intermediate layer, while not subject to any particular limitation, has a Durometer D hardness of preferably at least 60 but not more than 80, more preferably at least 63 but not more than 77, and even more preferably at least 67 but not more than 73. If the surface of the intermediate layer is softer than the above range, the ball may have too much spin receptivity on full shots, as a result of which an increased distance may not be achieved. On the other hand, if it is harder than the above range, the durability of the ball to cracking under repeated impact may worsen and the ball may have too hard a feel when played with a putter or on short approach shots.

To increase adhesion between the intermediate layer material and the polyurethane used in the subsequently described cover, it is desirable to abrade the surface of the intermediate layer. In addition, it is preferable to apply a primer (adhesive) to the surface of the intermediate layer following such abrasion or to add an adhesion reinforcing agent to the intermediate layer material. Examples of adhesion reinforcing agents that may be incorporated in the intermediate layer material include organic compounds such as 1,3-butanediol and trimethylolpropane, and oligomers such as polyethylene glycol and polyhydroxy polyolefin oligomers. The use of trimethylolpropane or a polyhydroxy polyolefin oligomer is especially preferred. Examples of commercially available products include trimethylolpropane produced by Mitsubishi Gas Chemical Co., Ltd. and polyhydroxy polyolefin oligomers produced by Mitsubishi Chemical Corporation (under the trade name designation Polytail H; number of main-chain carbons, 150 to 200; with hydroxyl groups at the ends).

Next, the cover is described. As used herein, the term "cover" denotes the outermost layer of the ball construction, and excludes what is referred to herein as the intermediate layer and the envelope layer.

The cover material has a hardness, expressed as the Durometer D hardness, which, while not subject to any particular limitation, is preferably at least 40 but not more than 60, more preferably at least 43 but nor more than 57, and even more preferably at least 46 but not more than 54. At a hardness below this range, the ball tends to take on too much spin on full shots, as a result of which an increased distance may not be achieved. On the other hand, at a hardness above this range, on approach shots, the ball lacks spin receptivity and thus may have an inadequate controllability even when played by a professional or other skilled golfer.

It is critical for the material hardness of the cover to be softer than the material hardness of the intermediate layer. The hardness difference between the intermediate layer material and the cover material, expressed in Durometer D hardness units, is preferably at least 1 but less than 40, more preferably at least 3 but less than 30, and even more preferably at least 6 but less than 20. If this difference is too small, the spin rate-lowering effect on full shots with a driver or an iron may be inadequate, as a result of which the desired distance may not be achieved.

The thickness of the cover, while not subject to any particular limitation, is preferably at least 0.3 mm but not more than 1.5 mm, more preferably at least 0.5 mm but not more than 1.3 mm, and even more preferably at least 0.7 mm but not more than 1.1 mm. If the cover is thicker than the above range, the ball may have an inadequate rebound on shots with a driver (W#1) or the spin rate may be too high, as a result of which an increased distance may not be achieved. Conversely, if the cover is thinner than the above range, the ball may have a poor scuff resistance and inadequate controllability even when played by a professional or other skilled golfer.

In the practice of the invention, the cover material is composed primarily of polyurethane, thereby enabling the intended effects of the invention, i.e., both a good controllability and a good scuff resistance, to be achieved.

The polyurethane used as the cover material, while not subject to any particular limitation, is preferably a thermoplastic polyurethane, particularly from the standpoint of amenability to mass production. In the practice of the invention, it is preferable to use a cover-molding material (C) composed primarily of components A and B below:

(A) a thermoplastic polyurethane material;

(B) an isocyanate mixture of (b-1) an isocyanate compound having at least two isocyanate groups as functional groups per molecule, dispersed in (b-2) a thermoplastic resin which is substantially non-reactive with isocyanate.

Components A, B and C are described below.

(A) Thermoplastic Polyurethane Material

The thermoplastic polyurethane material has a morphology which includes soft segments composed of a polymeric polyol (polymeric glycol) and hard segments composed of a chain extender and a diisocyanate. The polymeric polyol used as a starting material may be any that is employed in the art relating to thermoplastic polyurethane materials, without particular limitation. Exemplary polymeric polyols include polyester polyols and polyether polyols, although polyether polyols are better than polyester polyols for synthesizing thermoplastic polyurethane materials that provide a high rebound resilience and have excellent low-temperature properties. Suitable polyether polyols include polytetramethylene glycol and polypropylene glycol. Polytetramethylene glycol is especially preferred for achieving a good rebound resilience and good low-temperature properties. The polymeric polyol has an average molecular weight of preferably 1,000 to 5,000. To synthesize a thermoplastic polyurethane material having a high rebound resilience, an average molecular weight of 2,000 to 4,000 is especially preferred.

Preferred chain extenders include those used in the prior art relating to thermoplastic polyurethane materials. Illustrative, non-limiting, examples include 1,4-butylene glycol, 1,2-ethylene glycol, 1,3-butanediol, 1,6-hexanediol, and 2,2-dimethyl-1,3-propanediol. These chain extenders have an average molecular weight of preferably 20 to 15,000.

Diisocyanates suitable for use include those employed in the prior art relating to thermoplastic polyurethane materials. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. Depending on the type of isocyanate used, the crosslinking reaction during injection molding may be difficult to control. In the present invention, to ensure stable reactivity with the subsequently described isocyanate mixture (B), it is most preferable to use an aromatic diisocyanate, and specifically 4,4'-diphenylmethane diisocyanate.

A commercial product may be suitably used as the above-described thermoplastic polyurethane material. Illustrative examples include Pandex T-8290, Pandex T-8295 and Pandex T-8260 (all manufactured by DIC Bayer Polymer, Ltd.), and Resamine 2593 and Resamine 2597 (both manufactured by Dainichi Seika Colour & Chemicals Mfg. Co., Ltd.).

(B) Isocyanate Mixture

The isocyanate mixture (B) is prepared by dispersing (b-1) an isocyanate compound having as functional groups at least two isocyanate groups per molecule in (b-2) a thermoplastic resin that is substantially non-reactive with isocyanate. Above isocyanate compound (b-1) is preferably an isocyanate compound used in the prior art relating to thermoplastic polyurethane materials. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. From the standpoint of reactivity and work safety, the use of 4,4'-diphenylmethane diisocyanate is most preferred.

The thermoplastic resin (b-2) is preferably a resin having a low water absorption and excellent compatibility with thermoplastic polyurethane materials. Illustrative, non-limiting, examples of such resins include polystyrene resins, polyvinyl chloride resins, ABS resins, polycarbonate resins and polyester elastomers (e.g., polyether-ester block copolymers, polyester-ester block copolymers). From the standpoint of rebound resilience and strength, the use of a polyester elastomer, particularly a polyether-ester block copolymer, is especially preferred.

In the isocyanate mixture (B), it is desirable for the relative proportions of the thermoplastic resin (b-2) and the isocyanate compound (b-1), expressed as the weight ratio (b-2):(b-1), to be from 100:5 to 100:100, and especially from 100:10 to 100:40. If the amount of the isocyanate compound (b-1) relative to the thermoplastic resin (b-2) is too small, a greater amount of the isocyanate mixture (B) will have to be added to achieve an amount of addition sufficient for the crosslinking reaction with the thermoplastic polyurethane material (A). As a result, the thermoplastic resin (b-2) will exert a large influence, compromising the physical properties of the cover-molding material (C). On the other hand, if the amount of the isocyanate compound (b-1) relative to the thermoplastic resin (b-2) is too large, the isocyanate compound (b-1) may cause slippage to occur during mixing, making preparation of the isocyanate mixture (B) difficult.

The isocyanate mixture (B) can be obtained by, for example, adding the isocyanate compound (b-1) to the thermoplastic resin (b-2) and thoroughly working together these components at a temperature of 130 to 250° C. using mixing rolls or a Banbury mixer, then either pelletizing or cooling and subsequently grinding. A commercial product such as Crossnate EM30 (made by Dainichi Seika Colour & Chemicals Mfg. Co., Ltd.) may be suitably used as the isocyanate mixture (B).

(C) Cover-Molding Material

The cover-molding material (C) is composed primarily of the above-described thermoplastic polyurethane material (A) and isocyanate mixture (B). The relative proportion of the thermoplastic polyurethane material (A) to the isocyanate mixture (B) in the cover-molding material (C), expressed as the weight ratio A:B, is preferably from 100:1 to 100:100, more preferably from 100:5 to 100:50, and even more preferably from 100:10 to 100:30. If too little isocyanate mixture (B) is included with respect to the thermoplastic polyurethane material (A), a sufficient crosslinking effect will not be achieved. On the other hand, if too much is included, unreacted isocyanate may discolor the molded material.

In addition to the above-described ingredients, other ingredients may be included in the cover-molding material (C). For example, thermoplastic polymeric materials other than the thermoplastic polyurethane material may be included; illustrative examples include polyester elastomers, polyamide elastomers, ionomer resins, styrene block elastomers, polyethylene and nylon resins. Thermoplastic polymeric materials other than the thermoplastic polyurethane material may be included in an amount of 0 to 100 parts by weight, preferably 1 to 75 parts by weight, and more preferably 10 to 50 parts by weight, per 100 parts by weight of the thermoplastic polyurethane material serving as the essential component. The amount of such thermoplastic polymeric materials used is selected as appropriate for such purposes as adjusting the hardness of the cover material, improving the rebound, improving the flow properties, and improving adhesion. If necessary, various additives such as pigments, dispersants, antioxidants, light stabilizers, ultraviolet absorbers and parting agents may also be suitably included in the cover-molding material (C).

Formation of the cover from the cover-molding material (C) can be carried out by adding the isocyanate mixture (B) to the thermoplastic polyurethane material (A) and dry mixing, then using an injection molding machine to mold the mixture into a cover over the core. The molding temperature varies with the type of thermoplastic polyurethane material (A), although molding is generally carried out within a temperature range of 150 to 250° C.

Reactions and crosslinking which take place in the golf ball cover obtained as described above are believed to involve the reaction of isocyanate groups with hydroxyl groups remaining on the thermoplastic polyurethane material to form urethane bonds, or the creation of an allophanate or biuret crosslinked form via a reaction involving the addition of isocyanate groups to urethane groups in the thermoplastic polyurethane material. Although the crosslinking reaction has not yet proceeded to a sufficient degree immediately after injection molding of the cover-molding material (C), the crosslinking reaction can be made to proceed further by carrying out an annealing step after molding, in this way conferring the golf ball cover with useful characteristics. "Annealing," as used herein, refers to heat aging the cover at a constant temperature for a given length of time, or aging the cover for a fixed period at room temperature.

In the addition to the above resin components, various optional additives may be included in the above-described resin materials for the envelope layer, the intermediate layer and the cover. Such additives include, for example, pigments, dispersants, antioxidants, ultraviolet absorbers, ultraviolet stabilizers, parting agents, plasticizers, and inorganic fillers (e.g., zinc oxide, barium sulfate, titanium dioxide).

Thickness Relationship Between Envelope Layer, Intermediate Layer and Cover

In the practice of the invention, it is not subject to any particular limitation, but the relationship between the thicknesses of the envelope layer, the intermediate layer and the cover preferably satisfy the following conditions:

cover thickness<intermediate layer thickness.

In particular, it is more preferable for the following conditions to be satisfied:

cover thickness<intermediate layer thickness≤envelope layer thickness.

That is, with regard to the distribution in the thicknesses of the respective layers of the ball, by setting the core diameter to at least 31 mm and designing the ball such that the thicknesses of the layers become gradually smaller in the order of the above conditions, there can be obtained a ball which achieves a good flight performance, controllability, durability and feel on impact. Should the cover be thicker than the intermediate layer, the ball rebound may decrease or the ball may have excessive spin receptivity on full shots, as a result of which an increased distance may not be attainable. Should the envelope layer be thinner than the intermediate layer, the spin rate-lowering effect may be inadequate, possibly preventing the desired distance from being achieved.

Hardness Relationship Between Envelope Layer, Intermediate Layer and Cover

In the practice of the invention, in addition to optimizing the thickness relationship among the above respective layers, it is not subject to any particular limitation, but the relationship between the hardnesses of the respective layers preferably satisfy the following conditions:

core surface hardness≤envelope layer surface hardness, and　(1)

cover material hardness<intermediate layer material hardness.　(2)

In particular, it is preferable for the following conditions to be satisfied:

core surface hardness≤envelope layer surface hardness<intermediate layer material hardness>cover material hardness.

The technical significance of this hardness relationship is as related above in the descriptions of the respective members.

With regard to the hardness of the core, it is critical that the following relationship be satisfied:

core surface hardness−core center hardness (JIS-C)≥11.　(3)

The technical significance of this is also as described above.

The multi-piece solid golf ball of the invention can be manufactured using an ordinary process such as a known injection molding process to form on top of one another the respective layers described above: the core, envelope layer, intermediate layer, and cover. For example, a molded and vulcanized article composed primarily of the core material may be placed as the core within a particular injection-molding mold, following which the envelope layer-forming material and the intermediate layer-forming material may be injection-molded in this order to give an intermediate spherical body. The spherical body may then be placed within another injection-molding mold and the cover material injection molded over the spherical body to give a multi-piece golf ball. Alternatively, the cover may be formed as a layer over the intermediate spherical body by, for example, placing two half-cups, molded beforehand as hemispherical shells, around the intermediate spherical body so as to encase it, then molding under applied heat and pressure.

Numerous dimples may be formed on the surface of the cover. The dimples arranged on the cover surface, while not subject to any particular limitation, number preferably at least 280 but not more than 360, more preferably at least 300 but not more than 350, and even more preferably at least 320 but not more than 340. If the number of dimples is higher than the above range, the ball will tend to have a low trajectory, which may shorten the distance of travel. On the other hand, if the number of dimples is too small, the ball will tend to have a high trajectory, as a result of which an increased distance may not be achieved.

Any one or combination of two or more dimple shapes, including circular shapes, various polygonal shapes, dewdrop shapes and oval shapes, may be suitably used. If circular dimples are used, the diameter of the dimples may be set to at least about 2.5 mm but not more than about 6.5 mm, and the depth may be set to at least 0.08 mm but not more than 0.30 mm.

To fully manifest the aerodynamic characteristics of the dimples, the dimple coverage on the spherical surface of the golf ball, which is the sum of the individual dimple surface areas, each defined by the border of the flat plane circumscribed by the edge of the dimple, expressed as a ratio (SR) with respect to the spherical surface area of the ball were it to be free of dimples, is preferably at least 60% but not more than 90%. Also, to optimize the trajectory of the ball, the value V0 obtained by dividing the spatial volume of each dimple below the flat plane circumscribed by the edge of that dimple by the volume of a cylinder whose base is the flat plane and whose height from the base to the maximum depth of the dimple is preferably at least 0.35 but not more than 0.80. In addition, the VR value, which is the sum of the volumes of individual dimples formed below flat planes circumscribed by the dimple edges, as a percentage of the volume of the ball sphere were it to have no dimples thereon, is preferably at least 0.6% but not more than 1.0%. Outside of the above ranges for these values, the ball may assume a trajectory that is not conducive to achieving a good distance, as a result of which the ball may fail to travel a sufficient distance when played.

The golf ball of the invention, which can be manufactured so as to conform with the Rules of Golf for competitive play, may be produced to a ball diameter which is of a size that will not pass through a ring having an inside diameter of 42.672 mm, yet is not more than 42.80 mm, and to a weight of generally from 45.0 to 45.93 g.

As shown above, by using a specific resin mixture as the envelope layer, by using primarily a polyurethane material in the cover, by optimizing the hardnesses of the core, envelope layer, intermediate layer and cover, and by making the difference in hardness between the surface of the core and the center of the core large, the golf ball according to the invention is highly beneficial for professionals and other skilled golfers because it lowers the spin rate of the ball on full shots taken with a driver or an iron, thus providing an increased distance and good controllability, and because it has an excellent durability to cracking under repeated impact and an excellent scuff resistance.

EXAMPLES

Examples of the invention and Comparative Examples are given below by way of illustration, and not by way of limitation.

Examples 1 and 2, Comparative Examples 1 to 6

Formation of Core

Rubber compositions were formulated as shown in Table 1, then molded and vulcanized under the conditions shown in Table 1 to form cores. In Comparative Example 4, the rubber composition shown in Table 1 was prepared and vulcanized, following which the resulting center core was encased by the outer core layer (envelope layer) shown in Table 2 in an unvulcanized state, and the resulting sphere was molded and vulcanized to give a layered construction.

TABLE 1

| (parts by weight) | | Example | | Comparative Example | | | | | |
|---|---|---|---|---|---|---|---|---|---|
| | | 1 | 2 | 1 | 2 | 3 | 4 | 5 | 6 |
| Core formulation | Polybutadiene A | 0 | 0 | 0 | 0 | 0 | 0 | 0 | 100 |
| | Polybutadiene B | 80 | 80 | 80 | 80 | 80 | 80 | 80 | 0 |
| | Polybutadiene C | 20 | 20 | 20 | 20 | 20 | 20 | 20 | 0 |
| | Zinc acrylate | 34.2 | 31.0 | 34.2 | 34.2 | 31.0 | 34.2 | 40.6 | 25.7 |
| | Peroxide (1) | 0 | 0 | 0 | 0 | 0 | 0 | 0 | 0.6 |
| | Peroxide (2) | 3 | 3 | 3 | 3 | 3 | 3 | 3 | 0.6 |
| | Antioxidant (1) | 0.1 | 0.1 | 0.1 | 0.1 | 0.1 | 0.1 | 0.1 | 0 |
| | Antioxidant (2) | 0 | 0 | 0 | 0 | 0 | 0 | 0 | 0.1 |
| | Zinc oxide | 28.0 | 29.2 | 37.0 | 70.0 | 31.0 | 17.0 | 16.1 | 33.1 |
| | Zinc salt of pentachlorothiophenol | 1.5 | 1.5 | 1.5 | 1.5 | 1.5 | 1.5 | 1.5 | 0.3 |
| | Sulfur | 0.1 | 0.1 | 0.1 | 0.1 | 0.1 | 0.1 | 0.1 | 0 |
| | Zinc stearate | 5 | 5 | 5 | 5 | 5 | 5 | 5 | 5 |
| Vulcanization conditions | Temperature (° C.) | 155 | 155 | 155 | 155 | 155 | 155 | 155 | 155 |
| | Time (min) | 15 | 15 | 15 | 15 | 15 | 15 | 15 | 15 |

Trade names for some the materials appearing in the table are given below.

Polybutadiene A
  Available from JSR Corporation under the trade name BR01.
Polybutadiene B
  Available from JSR Corporation under the trade name BR730.
Polybutadiene C
  Available from JSR Corporation under the trade name BR51.
Peroxide 1
  Dicumyl peroxide, available from NOF Corporation under the trade name Percumyl D.
Peroxide 2
  A mixture of 1,1-di(t-butylperoxy)cyclohexane and silica, available from NOF Corporation under the trade name Perhexa C-40.
Antioxidant (1)
  2,6-di-t-butyl-4-methylphenol, produced by Ouchi Shinko Chemical Industry Co., Ltd. under the trade name Nocrac 200.
Antioxidant (2)
  2,2'-methylenebis(4-methyl-6-t-butylphenol), produced by Ouchi Shinko Chemical Industry Co., Ltd. under the trade name Nocrac NS-6.
Sulfur
  Available from Tsurumi Chemical Industry Co., Ltd. under the trade name Z Sulfur.

TABLE 2

| (parts by weight) | | Comparative Example 4 |
|---|---|---|
| Core formulation | Polybutadiene B | 100 |
| | Zinc acrylate | 46.6 |
| | Peroxide (2) | 2 |
| | Antioxidant (2) | 0 |
| | Zinc oxide | 11.0 |
| | Zinc salt of pentachlorothiophenol | 1.5 |
| | Zinc stearate | 5 |
| Vulcanization conditions | Temperature (° C.) | 155 |
| | Time (min) | 15 |

Note:
Details concerning the above materials are the same as in Table 1.

Formation of Envelope Layer, Intermediate Layer and Cover

Next, the envelope layer, intermediate layer and cover formulated from the various resin components shown in Table 3 were injection-molded, thereby forming over the core, in order, an envelope layer, an intermediate layer and a cover. In Comparative Example 4, the rubber material mentioned above was used as the envelope layer. Next, the dimples shown in Table 4, which were common to all the examples, were formed on the cover surface, thereby producing multi-piece solid golf balls.

TABLE 3

| Formulation (pbw) | No. 1 | No. 2 | No. 3 | No. 4 | No. 5 | No. 6 |
|---|---|---|---|---|---|---|
| Himilan 1605 | 68.75 | | | 50 | | |
| Himilan 1557 | | | 30 | 15 | | |
| Himilan 1706 | | | | 35 | | |
| Himilan 1855 | | | 20 | | | |
| AM7311 | | | | 50 | | |
| Surlyn 8120 | | 75 | | | | |
| AN4311 | | | | | | |
| Dynaron E6100P | 31.25 | 25 | | | | |
| Behenic acid | 18 | 20 | | | | |
| Calcium hydroxide | 2.3 | 2.3 | | | | |
| Calcium stearate | 0.15 | 0.15 | | | | |
| Zinc stearate | 0.15 | 0.15 | | | | |
| Trimethylolpropane | | | | 1.1 | | |
| Polytail H | 2 | | | | | |
| Pandex T-8295 | | | | | 100 | |
| Pandex T-8260 | | | | | | 100 |

TABLE 3-continued

| Formulation (pbw) | No. 1 | No. 2 | No. 3 | No. 4 | No. 5 | No. 6 |
|---|---|---|---|---|---|---|
| Titanium oxide | | | 2.2 | | 3.8 | 3.8 |
| Polyethylene | | | | | 1.4 | 1.4 |
| Isocyanate compound | | | | | 18 | 18 |

Trade names for some the materials appearing in the table are given below.

Himilan: An ionomer resin produced by DuPont-Mitsui Polychemicals Co., Ltd.

Surlyn: An ionomer resin produced by E.I. DuPont de Nemours & Co.

AM7311: An ionomer resin produced by DuPont-Mitsui Polychemicals Co., Ltd.

AN4311: Nucrel, produced by DuPont-Mitsui Polychemicals Co., Ltd.

Dynaron E6100P: A hydrogenated polymer produced by JSR Corporation.

Hytrel: A polyester elastomer produced by DuPont-Toray Co., Ltd.

Behenic acid: NAA222-S (beads), produced by NOF Corporation.

Calcium hydroxide: CLS-B, produced by Shiraishi Kogyo.

Polytail H: A low-molecular-weight polyolefin polyol produced by Mitsubishi Chemical Corporation.

Pandex: MDI-PTMG type thermoplastic polyurethane produced by DIC Bayer Polymer.

Isocyanate compound: Crossnate EM30, an isocyanate masterbatch which is produced by Dainichi Seika Colour & Chemicals Mfg. Co., Ltd., contains 300 of 4,4'-diphenylmethane diisocyanate (measured concentration of amine reverse-titrated isocyanate according to JIS K1556, 5 to 100), and in which the masterbatch base resin is a polyester elastomer. The isocyanate compound was mixed with Pandex at the time of injection molding.

TABLE 4

| No. | Number of dimples | Diameter (mm) | Depth (mm) | $V_0$ | SR | VR |
|---|---|---|---|---|---|---|
| 1 | 12 | 4.6 | 0.15 | 0.47 | 0.81 | 0.783 |
| 2 | 234 | 4.4 | 0.15 | 0.47 | | |
| 3 | 60 | 3.8 | 0.14 | 0.47 | | |
| 4 | 6 | 3.5 | 0.13 | 0.46 | | |
| 5 | 6 | 3.4 | 0.13 | 0.46 | | |
| 6 | 12 | 2.6 | 0.10 | 0.46 | | |
| Total | 330 | | | | | |

Dimple Definitions
Diameter: Diameter of flat plane circumscribed by edge of dimple.
Depth: Maximum depth of dimple from flat plane circumscribed by edge of dimple.
$V_0$: Spatial volume of dimple below flat plane circumscribed by dimple edge, divided by volume of cylinder whose base is the flat plane and whose height is the maximum depth of dimple from the base.
SR: Sum of individual dimple surface areas, each defined by the border of the flat plane circumscribed by the edge of the dimple, as a percentage of surface area of ball sphere were it to have no dimples thereon.
VR: Sum of volumes of individual dimples formed below flat plane circumscribed by the edge of the dimple, as a percentage of volume of ball sphere were it to have no dimples thereon.

The golf balls obtained in Examples 1 and 2 the invention and in Comparative Examples 1 to 6 were tested and evaluated according to the criteria described below with regard to the following: surface hardness and other physical properties of each layer and of the ball, flight performance, spin rate on approach shots (controllability), durability to repeated impact, and scuff resistance. The results are shown in Table 5. All measurements were carried out in a 23° C. environment.

(1) Core Deflection

The core was placed on a hard plate, and the deflection (mm) by the core when compressed under a final load of 1,275 N (130 kgf) from an initial load of 98 N (10 kgf) was measured.

(2) Core Center Hardness

The core was cut into hemispheres, the cut face was prepared as a flat plane, and measurement was carried out by pressing the durometer indenter perpendicularly against the cut face. The results are indicated as JIS-C hardness values.

(3-i) Core Surface Hardness (Measured as JIS-C Hardness)

The durometer was set substantially perpendicular to the surface portion of the spherical core, and the hardness was measured in accordance with the JIS-C hardness standard. The results are indicated as JIS-C hardness values.

The hardness difference between the surface of the core and the center of the core was obtained by subtracting the hardness value at the center of the core from the hardness value at the core surface obtained by measurement according to the JIS-C standard.

(3-ii) Core Surface Hardness (Measured as D Hardness)

Although the core surface is spherical, the durometer indenter was set substantially perpendicular to this spherical surface and Durometer D hardness measurements (using a type D durometer in accordance with ASTM D2240) were taken at two randomly selected points on the surface of the core. The average of the two measurements was used as the core surface hardness.

(4) Hardness of Envelope Layer Material

The resin material for the envelope layer was formed into a sheet having a thickness of about 2 mm, and the hardness was measured with a type D durometer in accordance with ASTM D2240.

(5) Surface Hardness of Envelope Layer-Covered Sphere

The durometer indenter was set substantially perpendicular to the spherical surface of the envelope layer, and measurements were taken in accordance with ASTM D2240.

(6) Hardness of Intermediate Layer Material

The resin material used in the intermediate layer was formed into a 2 mm thick sheet. After at least two weeks had elapsed, the hardness of the sheet was measured with a type D durometer in accordance with ASTM D2240.

(7) Surface Hardness of Intermediate Layer-Covered Sphere

The durometer indenter was set substantially perpendicular to the spherical surface of the intermediate layer, and measurements were taken in accordance with ASTM D2240.

(8) Hardness of Cover Material

The same method of measurement was used as in (6) above.

(9) Flight Performance

The carry and total distance of the ball when hit at a head speed (HS) of 45 m/s with a club (TourStage X-Drive Type 405, manufactured by Bridgestone Sports Co., Ltd.; loft angle, 9.5° mounted on a swing robot were measured. The results were rated according to the criteria indicated below. The spin rate was the value measured for the ball immediately following impact with an apparatus for measuring initial conditions.

Good: Total distance was 232.0 m or more
NG: Total distance was less than 232.0 m

(10) Spin Rate on Approach Shots

The spin rate of a ball hit at a head speed of 22 m/s with a sand wedge (abbreviated below as "SW"; J's Classical Edition, manufactured by Bridgestone Sports Co., Ltd.) was measured. The results were rated according to the criteria indicated below. The spin rate was measured by the same method as that used above when measuring distance.

Good: Spin rate of 6,600 rpm or more
Fair: Spin rate of at least 6,300 rpm but less than 6,600 rpm
NG: Spin rate of less than 6,300 rpm

(11) Durability to Repeated Impact

The ball was repeatedly hit at a head speed of 40 m/s with a W#1 club mounted on a golf swing robot. The number of shots that had been taken with the ball in Example 2 when the initial velocity fell below 97% of the average initial velocity for the first 10 shots was assigned a durability index of "100", and similarly obtained durability indices for the balls in each example were evaluated according to the following criteria. The average value for N=3 balls was used as the basis for evaluation in each example.

Good: Durability index was 90 or more
NG: Durability index was less than 90

(12) Scuff Resistance

A non-plated pitching sand wedge was set in a swing robot, and the ball was hit once at a head speed of 40 m/s, following which the surface state of the ball was visually examined and rated as follows.

Good: Can be used again
NG: Cannot be used again

As is apparent from the results in Table 5, in Comparative Example 1, the cover material was an ionomer and thus had a low scuff resistance. In Comparative Example 2, the core diameter was less than 31 mm; when the ball was hit with a number one wood (W#1), the spin rate was high and thus an increase in distance was not achieved. In Comparative Example 3, the cover was harder than the intermediate layer, as a result of which the ball was not receptive to spin on approach shots. In Comparative Example 4, the envelope layer material was rubber; the ball thus had a low durability to repeated impact. The ball in Comparative Example 5 was a three-piece golf ball composed of a core enclosed by two layers and lacking an envelope layer; because the spin rate was high, there was no increase in distance. In Comparative Example 6, the hardness difference between the core surface and the center of the core was less than 11 JIS-C units. Hence, the ball had a high spin rate when hit with a W#1, as a result of which an increased distance was not achieved.

TABLE 5

|  |  | Example | | Comparative Example | | | | | |
|---|---|---|---|---|---|---|---|---|---|
|  |  | 1 | 2 | 1 | 2 | 3 | 4 | 5 | 6 |
| Core | Diameter (mm) | 34.96 | 34.92 | 34.96 | 29.04 | 34.96 | 34.96 | 37.30 | 34.96 |
|  | Weight (g) | 27.46 | 27.40 | 28.50 | 18.51 | 27.63 | 25.86 | 31.86 | 27.46 |
|  | Deflection (mm) | 3.5 | 3.8 | 3.5 | 3.5 | 3.8 | 3.5 | 3.0 | 3.5 |
|  | Surface hardness (JIS-C) | 84 | 81 | 84 | 84 | 81 | 84 | 89 | 74 |
|  | Center hardness (JIS-C) | 63 | 61 | 63 | 63 | 61 | 63 | 63 | 64 |
|  | Surface - center (JIS-C) | 21 | 20 | 21 | 21 | 20 | 21 | 26 | 10 |
|  | Surface hardness (Shore D) | 56 | 53 | 56 | 56 | 53 | 56 | 59 | 48 |
| Envelope layer | Type | No. 1 | No. 1 | No. 1 | No. 1 | No. 2 | Rubber composition | — | No. 1 |
|  | Thickness (mm) | 1.68 | 1.69 | 1.67 | 4.08 | 1.67 | 1.67 | — | 1.67 |
|  | Specific gravity | 0.93 | 0.93 | 0.93 | 0.93 | 0.93 | 1.16 | — | 0.93 |
|  | Material hardness (Shore D) | 56 | 56 | 56 | 56 | 51 | — | — | 56 |
| Sphere[1] | Surface hardness (Shore D) | 61 | 61 | 61 | 61 | 56 | 60 | — | 61 |
|  | Diameter (mm) | 38.3 | 38.3 | 38.3 | 37.2 | 38.3 | 38.3 | — | 38.3 |
|  | Weight (g) | 34.1 | 34.0 | 35.1 | 31.7 | 34.2 | 34.0 | — | 34.0 |
| Intermediate layer | Type | No. 4 | No. 4 | No. 4 | No. 4 | No. 1 | No. 4 | No. 4 | No. 4 |
|  | Thickness (mm) | 1.17 | 1.17 | 1.18 | 1.73 | 1.18 | 1.18 | 1.68 | 1.18 |
|  | Specific gravity | 0.96 | 0.96 | 0.96 | 0.96 | 0.93 | 0.96 | 0.96 | 0.96 |
|  | Material hardness (Shore D) | 62 | 62 | 62 | 62 | 56 | 62 | 62 | 62 |
| Sphere[2] | Surface hardness (Shore D) | 70 | 70 | 70 | 70 | 61 | 70 | 70 | 70 |
|  | Diameter (mm) | 40.65 | 40.65 | 40.65 | 40.65 | 40.65 | 40.65 | 40.65 | 40.65 |
|  | Weight (g) | 39.5 | 39.5 | 40.6 | 39.5 | 39.5 | 39.5 | 39.5 | 39.5 |
| Cover | Type | No. 5 | No. 5 | No. 3 | No. 5 | No. 6 | No. 5 | No. 5 | No. 5 |
|  | Thickness (mm) | 1.03 | 1.02 | 0.96 | 1.03 | 1.03 | 1.03 | 1.03 | 1.03 |
|  | Specific gravity | 1.15 | 1.15 | 0.96 | 1.15 | 1.15 | 1.15 | 1.15 | 1.15 |
|  | Material hardness (D) | 53 | 53 | 53 | 53 | 58 | 53 | 53 | 53 |
| Ball | Diameter (mm) | 42.7 | 42.7 | 42.7 | 42.7 | 42.7 | 42.7 | 42.7 | 42.7 |
|  | Weight (g) | 45.5 | 45.5 | 45.5 | 45.5 | 45.5 | 45.5 | 45.5 | 45.5 |
| Flight performance | W#1 (HS, 45 m/s) Spin (rpm) | 2760 | 2696 | 2735 | 2980 | 2625 | 2808 | 2798 | 2782 |
|  | Carry (m) | 221.3 | 220.8 | 220.1 | 219.5 | 219.5 | 220.5 | 221.0 | 220.8 |
|  | Total distance (m) | 236.9 | 234.1 | 235.1 | 229.5 | 232.1 | 234.3 | 230.5 | 230.8 |
|  | Rating | good | good | good | NG | good | good | NG | NG |
|  | SW (HS, 22 m/s) Spin rate (rpm) | 6946 | 6796 | 6524 | 6975 | 6026 | 6966 | 6813 | 6856 |
|  | Rating | good | good | fair | good | NG | good | good | good |
| Durability to repeated impact | | good | good | good | good | good | NG | good | good |
| Scuff resistance | | good | good | NG | good | NG | good | good | good |

[1] Sphere composed of core covered by envelope layer.
[2] Sphere composed of core covered by envelope layer and intermediate layer.

The invention claimed is:

1. A multi-piece solid golf ball comprising a core, an envelope layer encasing the core, an intermediate layer encasing the envelope layer, and a cover which encases the intermediate layer and has formed on a surface thereof a plurality of dimples, wherein the core is made primarily of a rubber material and has a diameter of at least 31 mm, the envelope layer and intermediate layer are each made primarily of the same or different resin materials and the cover is made primarily of polyurethane, the material hardness of the cover is softer than the material hardness of the intermediate layer by the hardness difference of at least 1 but less than 40 in Durometer D hardness units; the envelope layer, intermediate layer and cover have thicknesses which satisfy the relationship cover thickness<intermediate layer thickness;

and the core, envelope layer, intermediate layer and cover have hardness relationships which satisfy the following three conditions:

core surface hardness≤envelope layer surface hardness, (1)

cover material hardness<intermediate layer material hardness, and (2)

core surface hardness−core center hardness (JIS-C)≥11. (3)

2. The multi-piece solid golf ball of claim 1, wherein the core, envelope layer, intermediate layer and cover have hardnesses which satisfy the relationship core surface hardness≤envelope layer surface hardness<intermediate layer material hardness>cover material hardness.

3. The multi-piece solid golf ball of claim 1, wherein the resin material making up the envelope layer is a mixture comprising, in admixture,
a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
(e) a non-ionomeric thermoplastic elastomer in a weight ratio between 100:0 and 50:50.

4. The multi-piece solid golf ball of claim 1, wherein the resin material making up the envelope layer is a mixture comprising:
100 parts by weight of a resin component composed of, in admixture,
a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
(e) a non-ionomeric thermoplastic elastomer in a weight ratio between 100:0 and 50:50;
(c) 5 to 80 parts by weight of a fatty acid and/or fatty acid derivative having a molecular weight of 280 to 1500; and
(d) 0.1 to 10 parts by weight of a basic inorganic metal compound capable of neutralizing un-neutralized acid groups in the base resin and component (c).

5. The multi-piece solid golf ball of claim 1, wherein the resin material making up the cover is a material composed primarily of a heated mixture of
(A) a thermoplastic polyurethane material, and
(B) an isocyanate mixture of (b-1) an isocyanate compound having at least two isocyanate groups as functional groups per molecule, dispersed in (b-2) a thermoplastic resin which is substantially non-reactive with isocyanate.

6. The multi-piece solid golf ball of claim 1, wherein the core material is composed of, in admixture, a rubber base, sulfur and an organosulfur compound.

7. The multi-piece solid golf ball of claim 1, wherein the envelope layer, intermediate layer and cover have thicknesses which satisfy the relationship:

cover thickness<intermediate layer thickness≤envelope layer thickness.

8. The multi-piece solid golf ball of claim 1, wherein the core has hardness which satisfy the relationship core surface hardness−core center hardness (JIS-C)≥15.

9. The multi-piece solid golf ball of claim 1, wherein the core has hardness which satisfy the relationship core surface hardness−core center hardness (JIS-C)≥20.

10. The multi-piece solid golf ball of claim 1, wherein the diameter of the core is 31 to 34.96 mm.

11. The multi-piece solid golf ball of claim 1, wherein the number of the dimples is at least 280 but not more than 360.

12. The multi-piece solid golf ball of claim 1, wherein the number of the dimples is at least 300 but not more than 350.

13. The multi-piece solid golf ball of claim 1, wherein the diameter of the dimples is set to at least 2.5 mm but not more than 6.5 mm.

14. The multi-piece solid golf ball of claim 1, wherein the depth of the dimples is set to at least 0.08 mm but not more than 0.30 mm.

15. The multi-piece solid golf ball of claim 1, wherein the dimple coverage on the spherical surface of the golf ball, which is the sum of the individual dimple surface areas, each defined by the border of the flat plane circumscribed by the edge of a dimple, expressed as a ratio (SR) with respect to the spherical surface area of the ball were it to be free of dimples, is at least 60% but not more than 90%.

16. The multi-piece solid golf ball of claim 1, wherein the value V0 obtained by dividing the spatial volume of each dimple below the flat plane circumscribed by the edge of that dimple by the volume of a cylinder whose base is the flat plane and whose height from the base to the maximum depth of the dimple is at least 0.35 but more than 0.80.

17. The multi-piece solid golf ball of claim 1, wherein the VR value, which is the sum of the volumes of individual dimples formed below flat planes circumscribed by the dimple edges, as a percentage of the volume of the ball sphere were it to have no dimples thereon, is at least 0.6% but not more than 1.0%.

18. The multi-piece solid golf ball of claim 1, wherein the intermediate layer material is composed primarily of, in admixture, both a zinc-neutralized ionomer resin and a sodium-neutralized ionomer resin in which the mixing ratio, expressed as the weight ratio of zinc-neutralized resin to sodium-neutralized resin is from 25/75 to 75/25.

19. A multi-piece solid golf ball comprising a core, an envelope layer encasing the core, an intermediate layer encasing the envelope layer, and a cover which encases the intermediate layer and has formed on a surface thereof a plurality of dimples, wherein the core is made primarily of a rubber material and has a diameter of at least 31 mm, the envelope layer and intermediate layer are each made primarily of the same or different resin materials and the cover is made primarily of polyurethane, the material hardness of the cover is softer than the material hardness of the intermediate layer by the hardness difference of at least 1 but less than 40 in Durometer D hardness units; the envelope layer, intermediate layer and cover have thicknesses which satisfy the relationship cover thickness<intermediate layer thickness≤envelope layer thickness;

and the core, envelope layer, intermediate layer and cover have hardness relationships which satisfy the following three conditions:

cover material hardness<intermediate layer material hardness, and (2)

core surface hardness−core center hardness (JIS-C)≥11. (3)

20. The multi-piece solid golf ball of claim 19, wherein the resin material making up the envelope layer is a mixture comprising, in admixture,
  a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
  (e) a non-ionomeric thermoplastic elastomer in a weight ratio between 100:0 and 50:50.

21. The multi-piece solid golf ball of claim 19, wherein the resin material making up the envelope layer is a mixture comprising:
  100 parts by weight of a resin component composed of, in admixture,
    a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
    (e) a non-ionomeric thermoplastic elastomer in a weight ratio between 100:0 and 50:50;
  (c) 5 to 80 parts by weight of a fatty acid and/or fatty acid derivative having a molecular weight of 280 to 1500; and
  (d) 0.1 to 10 parts by weight of a basic inorganic metal compound capable of neutralizing un-neutralized acid groups in the base resin and component (c).

22. The multi-piece solid golf ball of claim 19, wherein the resin material making up the cover is a material composed primarily of a heated mixture of
  (A) a thermoplastic polyurethane material, and
  (B) an isocyanate mixture of (b-1) an isocyanate compound having at least two isocyanate groups as functional groups per molecule, dispersed in (b-2) a thermoplastic resin which is substantially non-reactive with isocyanate.

23. The multi-piece solid golf ball of claim 19, wherein the core material is composed of, in admixture, a rubber base, sulfur and an organosulfur compound.

24. The multi-piece solid golf ball of claim 19, wherein the core has hardness which satisfy the relationship core surface hardness−core center hardness (JIS-C)≥15.

25. The multi-piece solid golf ball of claim 19, wherein the core has hardness which satisfy the relationship core surface hardness−core center hardness (JIS-C)≥20.

26. The multi-piece solid golf ball of claim 19, wherein the core and envelope layer have hardnesses which satisfy the relationship core surface hardness≤envelope layer surface hardness.

27. The multi-piece solid golf ball of claim 19, wherein the diameter of the core is 31 to 34.96 mm.

28. The multi-piece solid golf ball of claim 19, wherein the number of the dimples is at least 300 but not more than 350; the diameter of the dimples is set to at least 2.5 mm but not more than 6.5 mm; the depth of the dimples is set to at least 0.08 mm but not more than 0.30 mm; the dimple coverage on the spherical surface of the golf ball, which is the sum of the individual dimple surface areas, each defined by the border of the flat plane circumscribed by the edge of a dimple, expressed as a ratio (SR) with respect to the spherical surface area of the ball were it to be free of dimples, is at least 60% but not more than 90%; the value V0 obtained by dividing the spatial volume of each dimple below the flat plane circumscribed by the edge of that dimple by the volume of a cylinder whose base is the flat plane and whose height from the base to the maximum depth of the dimple is at least 0.35 but more than 0.80; the VR value, which is the sum of the volumes of individual dimples formed below flat planes circumscribed by the dimple edges, as a percentage of the volume of the ball sphere were it to have no dimples thereon, is at least 0.6% but not more than 1.0%.

29. The multi-piece solid golf ball of claim 19, wherein the intermediate layer material is composed primarily of, in admixture, both a zinc-neutralized ionomer resin and a sodium-neutralized ionomer resin in which the mixing ratio, expressed as the weight ratio of zinc-neutralized resin to sodium-neutralized resin is from 25/75 to 75/25.

* * * * *